(12) United States Patent
Schoerghuber et al.

(10) Patent No.: US 11,815,877 B2
(45) Date of Patent: Nov. 14, 2023

(54) METHOD FOR AUTOMATICALLY DETERMINING OPTIMUM WELDING PARAMETERS FOR CARRYING OUT A WELD ON A WORKPIECE

(71) Applicant: Fronius International GmbH, Pettenbach (AT)

(72) Inventors: Manfred Schoerghuber, Pettenbach (AT); Bernhard Moertendorfer, Pettenbach (AT); Daniel Angermayr, Pettenbach (AT); Helmut Ennsbrunner, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 441 days.

(21) Appl. No.: 16/959,767

(22) PCT Filed: May 6, 2019

(86) PCT No.: PCT/EP2019/061539
§ 371 (c)(1),
(2) Date: Jul. 2, 2020

(87) PCT Pub. No.: WO2019/215079
PCT Pub. Date: Nov. 14, 2019

(65) Prior Publication Data
US 2020/0363787 A1    Nov. 19, 2020

(30) Foreign Application Priority Data
May 7, 2018 (EP) .................... 18171040

(51) Int. Cl.
G05B 19/4155 (2006.01)
B23K 31/12 (2006.01)
(Continued)

(52) U.S. Cl.
CPC ............ *G05B 19/4155* (2013.01); *B23K 9/02* (2013.01); *B23K 9/0953* (2013.01);
(Continued)

(58) Field of Classification Search
CPC ...... G05B 19/4155; G05B 2219/45135; B23K 9/02; B23K 9/0953; B23K 9/0956; B23K 9/125
See application file for complete search history.

(56) References Cited

U.S. PATENT DOCUMENTS

| 6,670,574 B1 | 12/2003 | Bates et al. |
| 7,129,438 B2 | 10/2006 | Bates et al. |

(Continued)

FOREIGN PATENT DOCUMENTS

| CN | 1476951 A | 2/2004 |
| CN | 102985211 A | 3/2013 |

(Continued)

OTHER PUBLICATIONS

Chinese Office Action in CN201980028577.4, dated Sep. 28, 2021.
(Continued)

*Primary Examiner* — William J Levicky
*Assistant Examiner* — Keith Brian Assante
(74) *Attorney, Agent, or Firm* — Collard & Roe, P.C.

(57) ABSTRACT

A method for automatically determining optimum welding parameters for carrying out a weld on a workpiece carries out test welds on test workpieces along test welding tracks, and at each test weld a welding parameter is changed automatically along the test welding track from a predefined initial value to a predefined final value. Each resulting test weld seam is measured along the test welding track with a sensor, and a sensor signal is received. A quality parameter characterizing each test weld seam is calculated from the sensor signal. A quality function for characterizing the test (Continued)

Figure 1:
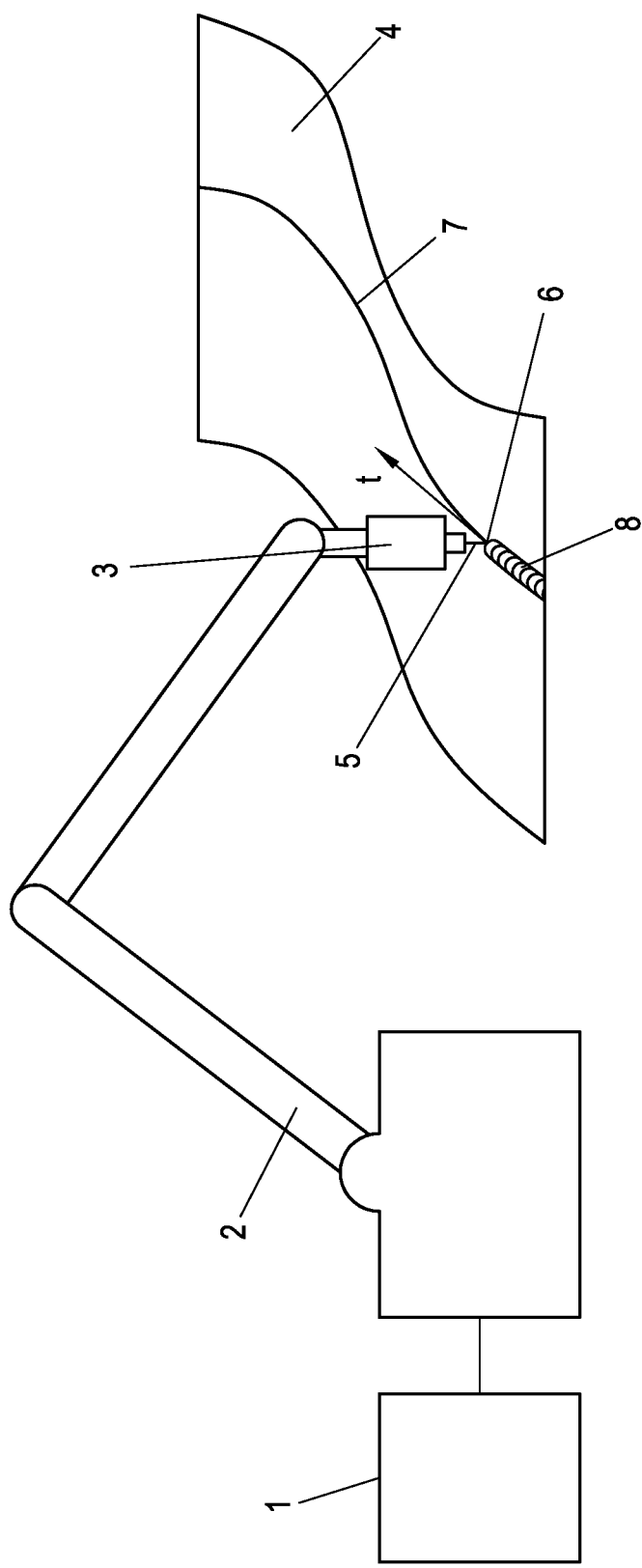

weld seam quality in accordance with the changed weld parameters is calculated from the quality parameter. An optimum quality function is ascertained, and the values for the optimum welding parameters are defined based on each quality parameter at this quality function optimum and the corresponding test weld track locations and saved.

12 Claims, 6 Drawing Sheets

(51) Int. Cl.
*B23K 9/095* (2006.01)
*B23K 9/02* (2006.01)
(52) U.S. Cl.
CPC .......... *B23K 9/0956* (2013.01); *B23K 31/125* (2013.01); *G05B 2219/45135* (2013.01)

(56) References Cited

U.S. PATENT DOCUMENTS

| | | | |
|---|---|---|---|
| 10,350,695 B2 | 7/2019 | Aberg | |
| 2004/0069754 A1* | 4/2004 | Bates | B23K 26/22 219/121.64 |
| 2013/0193123 A1 | 8/2013 | Saint-Martin et al. | |
| 2017/0036288 A1* | 2/2017 | Albrecht | B23K 31/125 |
| 2019/0240759 A1 | 8/2019 | Ennsbrunner et al. | |
| 2019/0299316 A1 | 10/2019 | Aberg | |

FOREIGN PATENT DOCUMENTS

| | | |
|---|---|---|
| CN | 103079741 A | 5/2013 |
| CN | 104679806 A | 6/2015 |
| CN | 106180986 A | 12/2016 |
| EP | 1 415 755 A2 | 5/2004 |
| EP | 2 580 017 B1 | 4/2014 |
| EP | 3 269 487 A1 | 1/2018 |
| JP | H04-040450 B2 | 7/1992 |
| JP | H06-170539 A | 6/1994 |
| JP | 2001-079683 A | 3/2001 |
| JP | 2004-066340 A | 3/2004 |
| JP | 5740470 B2 | 6/2015 |
| JP | 5968294 B2 | 8/2016 |
| JP | 6005638 B2 | 10/2016 |
| WO | 2018/011243 A1 | 1/2018 |

OTHER PUBLICATIONS

International Search Report in PCT/EP2019/061539, dated Aug. 2, 2019.
European Search Report in EP 18171040.1-1016, dated Nov. 26, 2018, with English translation of relevant parts.

* cited by examiner

METHOD FOR AUTOMATICALLY DETERMINING OPTIMUM WELDING PARAMETERS FOR CARRYING OUT A WELD ON A WORKPIECE

CROSS REFERENCE TO RELATED APPLICATIONS

This application is the National Stage of PCT/EP2019/061539 filed on May 6, 2019, which claims priority under 35 U.S.C. § 119 of European Application No. 18171040.1 filed on May 7, 2018, the disclosure of which is incorporated by reference. The international application under PCT article 21(2) was not published in English.

The invention relates to a method for automatically determining optimum welding parameters for carrying out a weld on a workpiece.

Welding processes are often very complex procedures, because welding processes for carrying out a weld operate on workpiece surfaces, the geometry of which differs almost with each welding task. In addition, a plurality of welding parameters such as welding current, material of the workpiece, wire feed speed and material of the welding wire, to name only a few, affect the welding process. Furthermore, welding processes have a highly movement-dependent component, i.e. the angle of attack and the working angle of the welding torch, the welding speed, the workpiece position etc. influence the welding process.

The finding and setting of optimum welding parameters and correction parameters is a difficult task which involves much expenditure of time by specialists and/or testing effort. Mostly, the welding parameters are found intuitively or are simply defined and do not represent an optimum as regards the possibilities of a weld for a specific welding task in a specific welding position, but rather a compromise. Usually nowadays experts are instructed to find and define optimum welding parameters for specific welding tasks on specific workpieces. After these time-consuming and costly steps, the welding is carried out on this workpiece with these defined welding parameters. When defects are detected on the welded workpiece or when specific prerequisites change, such as e.g. workpiece geometries, then the process of finding optimum welding parameters for achieving optimum welding results must be started again anew, which in turn involves additional costs and waiting times.

For example, WO 2018/011243 A1 describes a method for the defining of welding parameters for a welding process in which, without the assistance of experts, welding processes can be parameterized along any desired welding tracks, by the welding parameters for the respective welding process being defined by interpolation by means of ideal welding parameters which were received and saved under test conditions on test workpieces. Therefore, the welding parameters for specific workpiece geometries can be automatically put together from previously defined ideal welding parameters, without the welder having to be active in this respect. Here, the ideal welding parameters on the test workpieces were defined for a specific welding task which is to be solved. However, such tasks can vary very greatly depending on requirements, for which reason limits are set on this method.

EP 1 415 755 A2 describes a laser welding monitoring system and method, which is intended to be simpler compared to conventional very complex systems for quality assessment of weld seams. A method is described in which for an adjustment of sensor systems the quality of a weld seam is assessed more simply through corresponding combination of sensor signals. Here, test welds are used, in order to calibrate the sensor system.

The problem of the present invention consists in providing an above-mentioned method for automatically determining optimum welding parameters by which, also without specialists or experts, optimum welding parameters can be found automatically for a specific weld to achieve an optimum welding quality and optimum welding conditions. The method is to be able to be carried out as simply and as rapidly as possible. Disadvantages of methods hitherto are to be reduced or avoided.

The problem according to the invention is solved in that
a plurality of test welds are carried out on test workpieces along test welding tracks, and at each test weld at least one welding parameter is changed automatically along the test welding track from a predefined initial value to a predefined final value,
each resulting test weld seam is measured along the test welding track with at least one sensor, and at least one sensor signal is received,
at least one quality parameter which characterizes each test weld seam is calculated from at least one sensor signal,
a quality functional for characterizing the quality of the test weld seams in accordance with the changed welding parameters is calculated from the at least one quality parameter,
an optimum of the quality functional is determined, and the values for the optimum welding parameters are defined on the basis of each quality parameter at this optimum of the quality functional and the corresponding locations on the test weld tracks and saved.

The method according to the invention therefore makes provision that for a specific welding task, optimum welding parameters are automatically found, to achieve an optimum welding quality and optimum welding conditions, without the direct involvement of an expert or specialist being necessary. Accordingly, the method makes provision that automatically a series of test welds is carried out on test workpieces under predefined conditions, in which the relevant welding parameters for the solution to the respective welding task are varied and from the assessment of the resulting test weld seams along the test welding tracks, the locations along the test welding track are identified at which the welding result of the test weld is optimum. In order to be able to characterize the test weld seams, quality parameters are introduced which can be defined differently according to the welding task. For example, for visible weld seams on a workpiece, quality parameters such as e.g. seam thickness, seam scaling, seam width, etc., can be more important or crucial, whereas in the case of other welding tasks, other quality parameters, such as e.g. the seam superelevation, the seam transition angle, or suchlike, can be paramount. Also, the indirect measuring of the test weld seams is possible via the capturing of parameters of the weld current source quasi via internal current source sensors. For easier manageability of the complex and multidimensional correlations between the welding parameters, a so-called quality functional is calculated from the quality parameters characterizing the weld seams, in accordance with the respective welding task, which quality functional characterizes the quality of the test weld seams dependent on the changed welding parameters. With the quality functional, an easily manageable real number is created as a function of all quality parameters for characterizing the quality of the test weld seams, from which an optimum can be determined by relatively simple methods. From this optimum of the quality functional or quality criterion, the optimum quality parameters, and therefrom the locations at the test weld seams with optimum quality characteristics, and therefrom the respective optimum welding parameters can be defined and saved. Of course, more optima of the quality functional may exist from which a specific optimum is selected as basis for the determining of the optimum welding parameters. With these optimum welding parameters, the welding is then carried out on the workpiece and automatically an optimum welding quality is achieved under optimum welding conditions. The method according to the invention transfers the knowledge of the experts and specialists in the field of welding technology into the quality parameters for characterizing the test weld seams and the calculation of a quality functional for characterizing the quality of the test weld seams, so that automatically for fulfilling specific welding tasks, the optimum welding parameters for this can be found quickly and easily. Therefore, the optimum welding parameters for specific welds on specific workpieces can be defined more quickly and without direct involvement of corresponding experts. In the case of changes to the welding task, likewise changes can be reacted to quickly and with lower costs, and the optimum welding parameters can be defined or respectively corrected more quickly. For carrying out the method, corresponding devices are necessary for the automatic moving of the welding torch and/or of the test workpiece in the form of a welding robot or suchlike and a corresponding control by means of a computer. For the automatic measuring of the test weld seams of the test welding tracks, sensors are necessary which are determined according to the respective welding task, which sensors deliver the sensor signals for the calculation of the quality parameters. Internal sensors, which receive parameters of the welding current source during the carrying out of the test welding, can deliver data for the assessment of the test weld seams. The subsequent processing operations of the extensive data takes place by means of corresponding calculation rules and/or tables.

According to a feature of the invention, the test welding tracks are measured before carrying out the test welds. Through such a measuring of the test welding tracks on the test workpieces before carrying out the test welds it is ensured that the test welding tracks have the same initial situations and therefore the conditions are always identical. Thereby a reproducibility of the data and a comparability is guaranteed. The measuring of the test welding tracks can take place with the aid of suitable sensors.

For the assessment of the test weld seams along the test welding tracks, these can be measured during or after carrying out the test welds. The test weld seams are assessed or respectively sampled or scanned with suitable sensors or suchlike, which can also be arranged directly on the welding torch or in the current source, so that the characteristics of the produced test weld seams can be determined along the test welding tracks. During the carrying out of the test welding, the melt bath can be observed immediately after the test welding by means of suitable sensors, such as e.g. laser sensors or sensors for determining the radiation emissions. Alternatively or additionally, the test weld seam can of course also be examined after the solidifying of the melt bath and can be assessed according to the most varied of standpoints. However, the stability of the test welding and consequently indirectly the quality of the test weld seam can also be assessed with sensors which are internal to the welding equipment.

With each test weld, preferably at least one of the welding parameters: wire feed speed of a welding wire which is to be melted off, welding speed, free welding wire length, angle of attack of the welding torch (angle longitudinally to the weld seam), working angle of the welding torch (angle transversely to the weld seam) and tool center point of the welding torch along test welding track, is changed. The listed welding parameters are those parameters which significantly influence the weld seam and the welding quality. Depending on the respective welding task and the respective workpiece which is to be processed, other or further parameters can also be important, however, and can be changed at the test welds. The evaluation of the stability of the weld also constitutes for example an important criterion for the assessment of the welding quality and of the welding problem which is to be solved. The stability can be determined in a simple manner through internal determining of the parameters of the welding current source.

According to a further feature of the invention, the test welds are carried out along predefined test welding tracks with a constant tangential vector, in particular along straight test welding tracks with a length of preferably 10 cm to 50 cm. In addition to the position of the test workpiece, the shape of the test welding track also has an influence on the carrying out of the test weld. With a constant tangential vector, the curvature of the test welding track is constant. This therefore preferably concerns a straight test welding track or a test welding track in the form of a circle. The indicated preferred length permits a change to the respective welding parameter in usual limits and thereafter a sufficiently accurate assessment of a change in the quality of the test weld seam along the test welding track. Of course, several parameter searches can be carried on only one test workpiece and along a test welding track various welding parameters can be changed in succession from an initial value to a final value, or for each welding parameter separate test workpieces with only one test welding track are used.

When the test welds are carried out on flat test workpieces, which are preferably arranged in the position of the respective welding task, a rapid and simple running of the test welds is possible. Through the use of flat test workpieces, the influence of gravitational acceleration on the test workpiece can be kept constant. In the simplest case, the arrangement of the test workpieces can also be horizontal. When the position of the test workpiece is to be universal to the respective welding task, several test welds can also be carried out on test workpieces in different positions, therefore with a different arrangement with respect to the gravitational acceleration vector, and taken into consideration in the defining of the quality parameters.

The test weld seams along the test welding track can be measured with the aid of non-destructive measuring methods, for example optical sensors, in particular laser scanners, cameras or suchlike, X-ray sensors and/or temperature sensors preferably during the carrying out of the test weld. A scanning of the test weld seams along the test welding track of the test workpieces with contactless sensors has the advantage that the measuring of the test weld seams can be carried out particularly quickly and along the entire test welding track. In the case of particular influencing factors, it can be advantageous to carry out the measuring of the test weld seams immediately after the test welding. For example, the temperature profile in the material of the test workpiece immediately after the carrying out of the test welding can provide a statement concerning the material structure within and around the test weld seam. In the case of other quality parameters of the test weld seam, such as e.g. the seam thickness, seam width, seam superelevation, seam transition angle, undercut or amount of spatter and pore count, it can also be advantageous to carry out the measuring of the test weld seam only some time after carrying out the test weld.

Likewise, the test weld seams can be processed along the test welding track by means of destructive measurement methods, for example by the making of at least one micrograph of the test weld seam at one or more predefined distances along the test welding track. Such naturally more complex measuring methods can only be carried out at few locations along the test welding track, however they provide substantial knowledge also concerning the inner structure of the test weld seam, which could not be determined by contact-free measurement methods. The micrographs of the test weld seam at particular locations along the test welding track can be analyzed, in turn, by various methods, in particular by means of cameras and image processing methods connected therewith. The use of particular chemicals can improve the detection of the structure of the micrographs of the test weld seam. A macroscopic examination of micrographs after the welding can also provide characteristic quality parameters. The micrographs are analyzed and in the form of specific sensor signals and as a result of characterizing quality parameters the quality of the test weld seam is determined and saved depending on the respective welding parameter or respectively the respective location along the test welding track. Depending on the welding task, this quality parameter is assessed accordingly and as a result it is defined where or respectively with which welding parameter the optimum welding result is fulfilled taking this task into consideration. In addition to the production of micrographs, tensile tests, bending tests etc. on the test workpieces are also conceivable.

With each test weld, preferably at least one welding parameter is varied from the predefined initial value to the predefined final value linearly along the test welding track on a predefined length. This method facilitates on the one hand the carrying out of the test weld, and on the other hand the back calculation to the respective welding parameter which is regarded as optimum, with defining of the location along the test welding track at which the test weld seam has provided the optimum result with regard to the welding problem which has been presented. Of course, it is also possible, instead of defining predefined initial value and a predefined final value of the welding parameter, to also only predefine an initial value and to define a specific rate of change instead of a final value. For example, the angle of attack can be defined with a specific initial value at the start of the test welding track and can be raised with a rate of change of for example 1°/cm of the test weld seam over a length of 40 cm. The variation of the welding parameters can of course also take place in stages in particular with greater parameter ranges, in order to achieve that the system can settle. The subsequent analysis of the test welds or respectively test weld seams then preferably takes place in those regions in which the entire welding system was settled.

The test welds can be carried out under various welding conditions, and the optimum welding parameters for the welding under a predefined welding condition is carried out by interpolation of the optimum welding parameters which were determined in test welds under the bordering welding conditions for the predefined welding condition. When for example the workpiece temperature has an influence on the welding which is to be carried out on the workpiece, several test welds can be carried out on test workpieces under various workpiece temperatures as welding condition, and the optimum welding parameters, taking into consideration the present workpiece temperature (or respectively ambient temperature, if it is assumed that the workpiece has taken the ambient temperature) can be taken into account before carrying out the welding on the workpiece. Since practically only a finite number of test welds can be carried out under different welding conditions, in order to keep the expenditure small, those test welds under the welding conditions for the defining of the optimum welding parameters are drawn upon whose welding conditions below and above the actual welding conditions, for example below and above the possible workpiece temperature on carrying out the welding, are drawn upon and defined through interpolation of the optimum welding parameters. In addition to the named example of the workpiece temperature, further welding conditions can be the location of the workpiece, the tolerances of the seam geometry around the test welding track or the tolerances of the gap width of the test welding track.

The test welds are preferably carried out under at least two different welding conditions, respectively the workpiece temperature, the location of the test workpiece, the seam geometry on the test workpieces or the gap width. In order to keep the expenditure small for carrying out the test welds, these can be defined only under a few different welding conditions and an interpolation can be carried out with regard to the respective welding condition. Before defining the optimum welding parameters through interpolation of the results of two different test welds under two different welding conditions, a check can take place as to whether the interpolation is functioning, by a test weld being carried out with the interpolated welding parameters. When this does not produce an optimum quality, the fineness of the different test welds under different welding conditions can be increased, and further test welds can be carried out under several welding conditions. It can thereby be prevented that with non-linear relationships between welding parameters and the welding quality through interpolations welding parameters arise which lead to an impairment of the quality criteria.

Before carrying out the interpolation, preferably the quality functional is determined at the predefined welding condition, when the quality functional deviates from a default value (i.e. the quality criteria are not met), at least one further test weld is carried out with regard to a further welding condition. Through this automatic provision, which determines whether the quality functional was impaired, it can be prevented that between welding conditions which are too far apart, a linear interpolation of the welding parameters is carried out which would not lead to optimum welding parameters and would therefore lead to a poor quality of the resulting weld seam. Hereby, the pattern of test welds which are to be carried out can be quasi automatically refined under various welding conditions subsequently, when it transpires that the original pattern was selected too loosely, therefore test welds were carried out at too few welding conditions.

According to further features of the invention, the width, height, superelevation, under-curvature, the seam filling volume or the transition angle of the test weld seam is scanned and from these sensor signals the quality parameter is calculated along the test welding track. By means of the listed features of the test weld seam, the test weld seam can be assessed sufficiently well for most welding tasks and therefore a conclusion can be carried out with regard to an optimum quality parameter and thus the optimum welding parameters with sufficient accuracy. For example, the path of the welding torch which is traveled, at which the optimum quality parameter is found, makes possible the easy allocation and transfer of the quality-determining parameter of known initial and final value.

The optimum of the quality functional can be determined through successive changing respectively of a welding parameter for influencing respectively a quality parameter. This represents a possibility for finding the optimum or respectively an optimum of the quality functional in multi-dimensional space, which is able to be managed more easily, but can take up more time.

Alternatively, the optimum of the quality functional can also be determined through changing in terms of gradient several welding parameters for influencing several quality parameters. In this way, the computational effort is indeed increased in certain circumstances, but the result is found in a shorter length of time. The optimum of the quality functional is generally the maximum of the quality functional or respectively a maximum of the quality functional or a minimum of the quality functional in the case of several minima.

The invention is explained further with the aid of the enclosed drawings.

Figure 2:
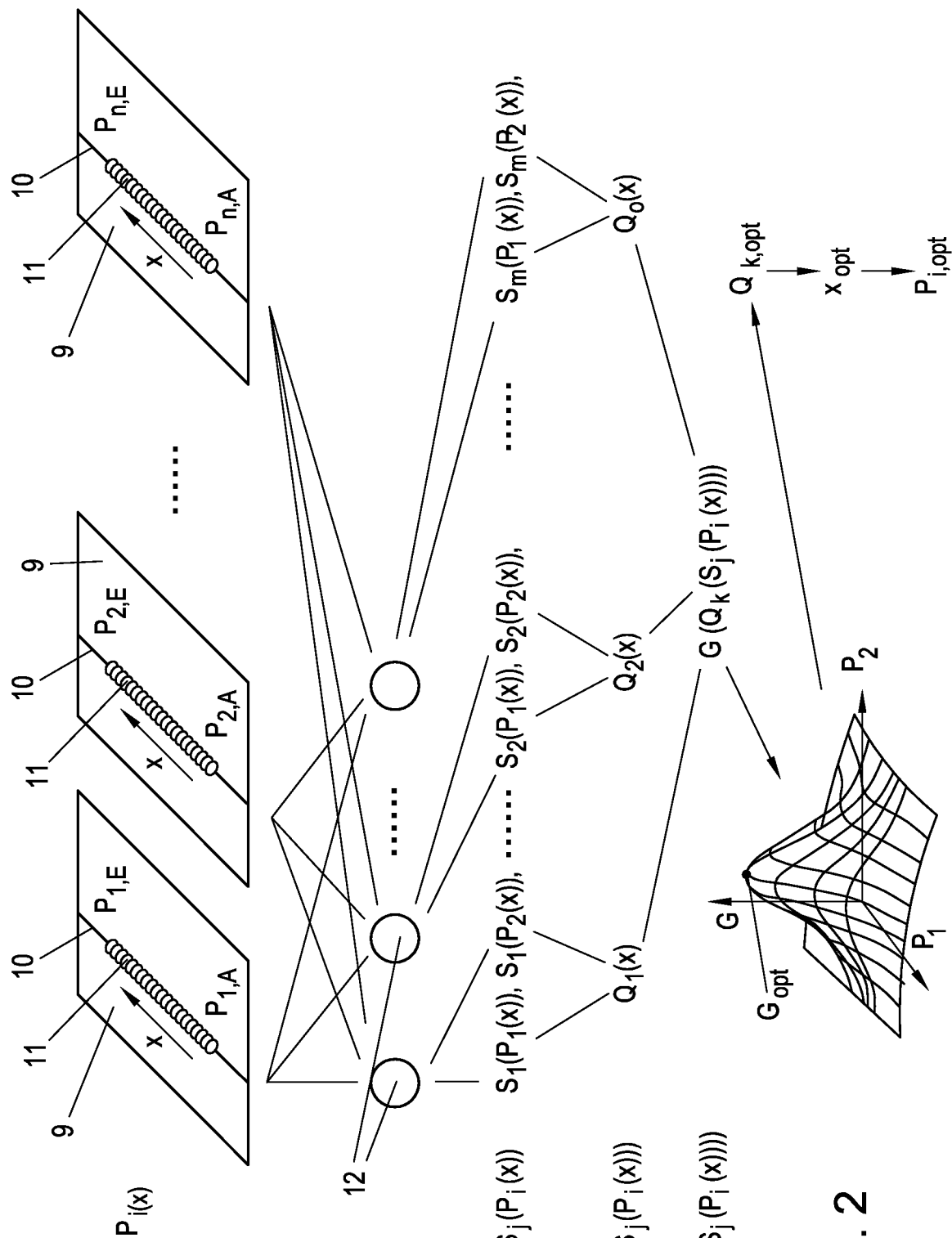
Figure 3:
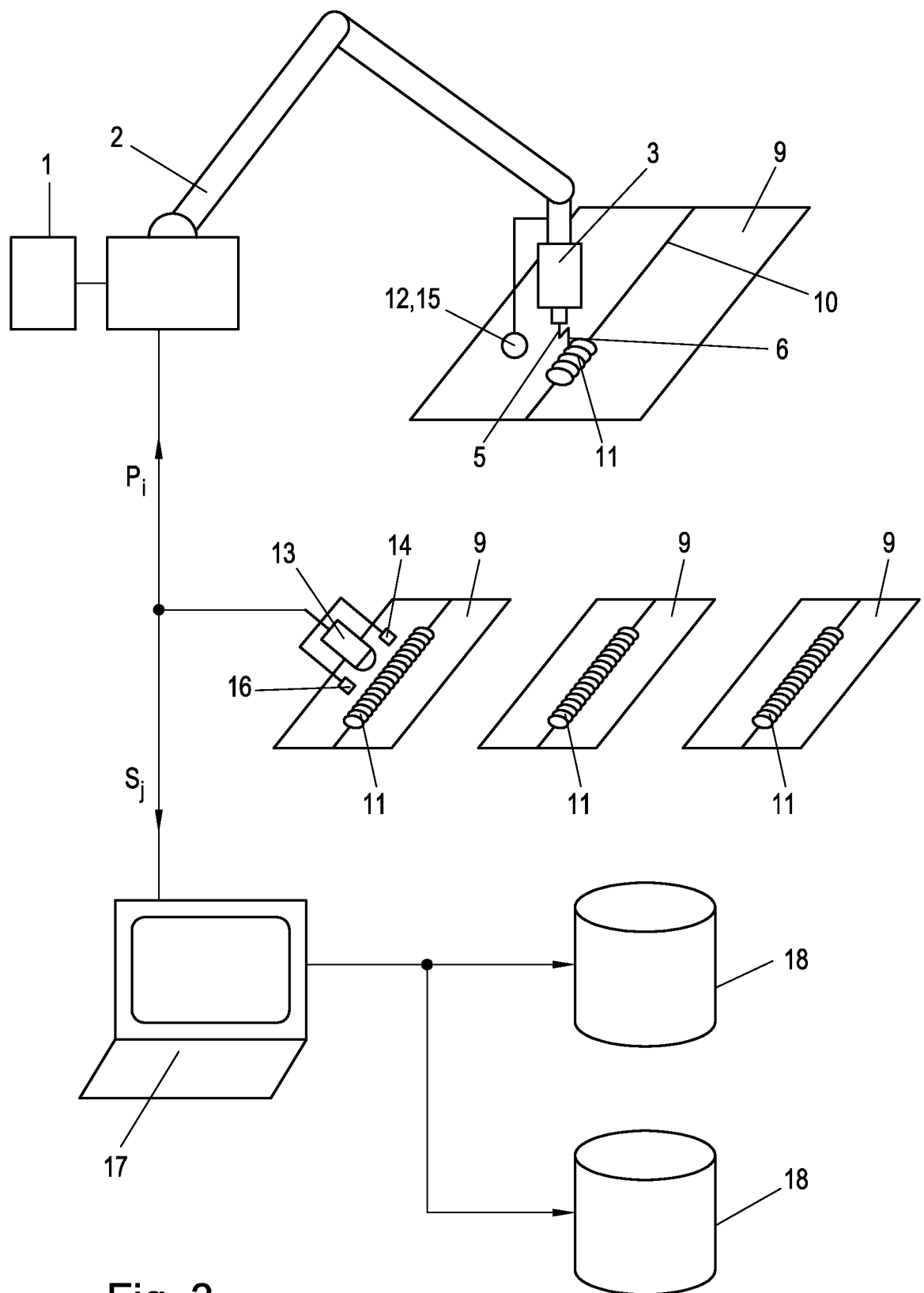
Figure 4:
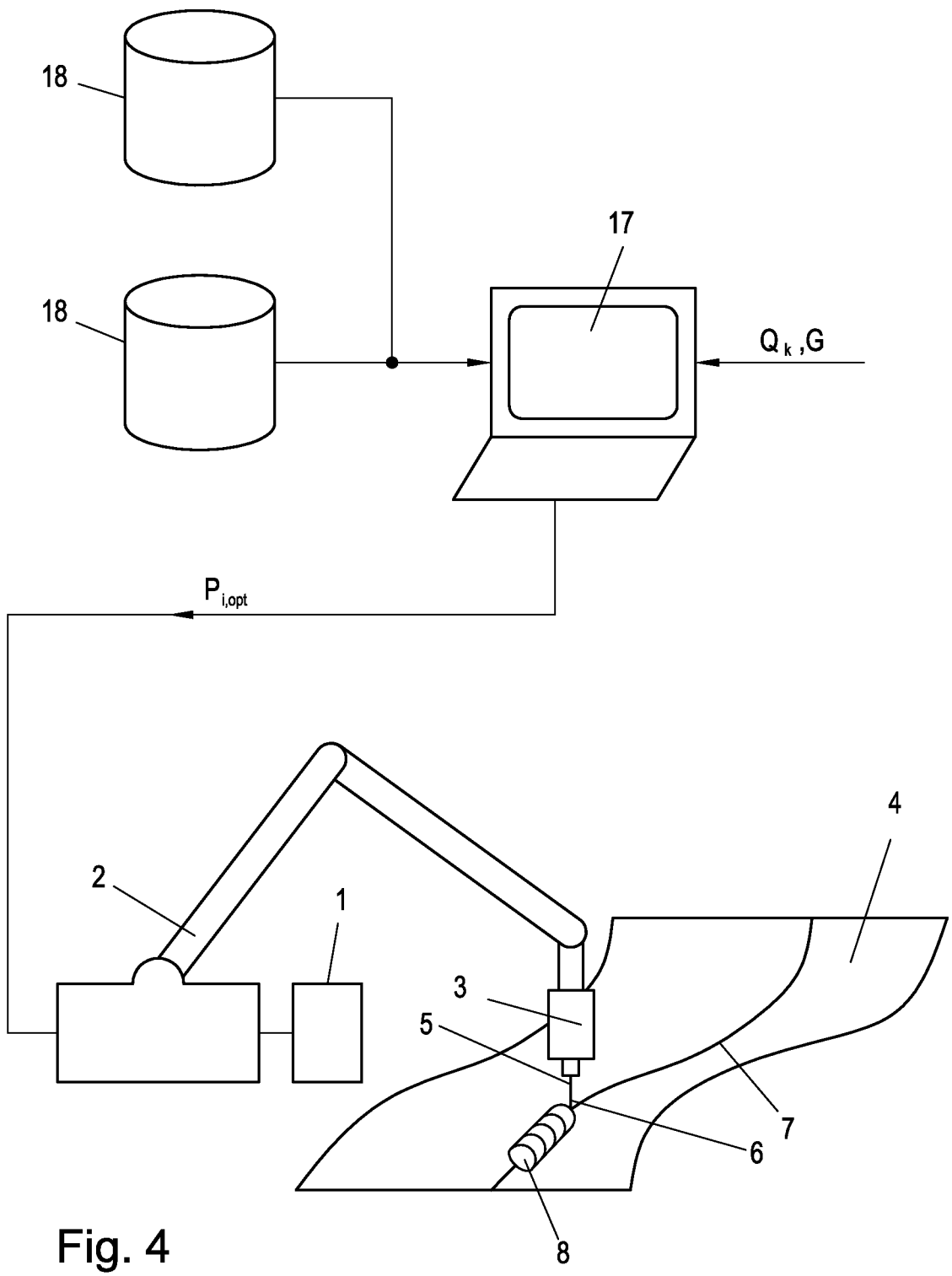
Figure 5A:
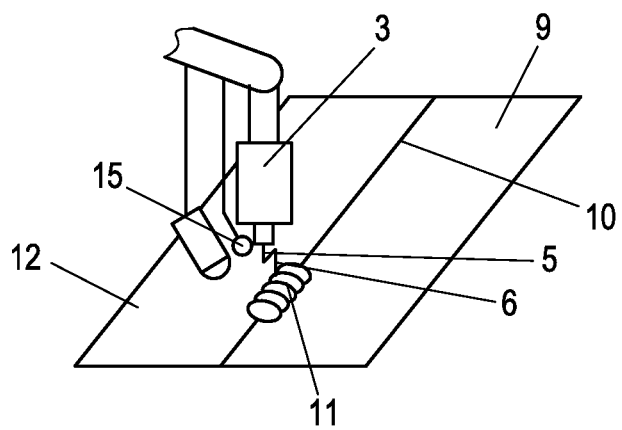
Figure 5B:
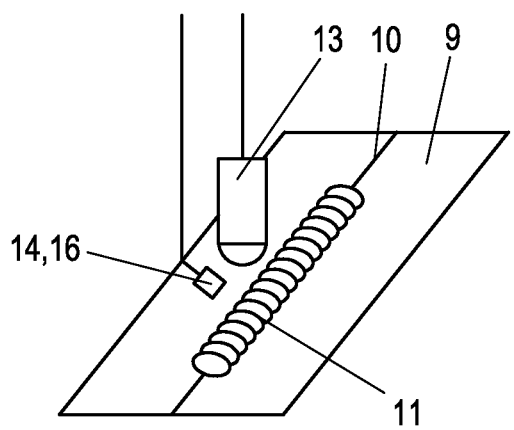
Figure 5C:
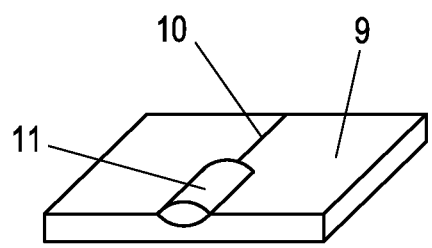
Figure 5C:
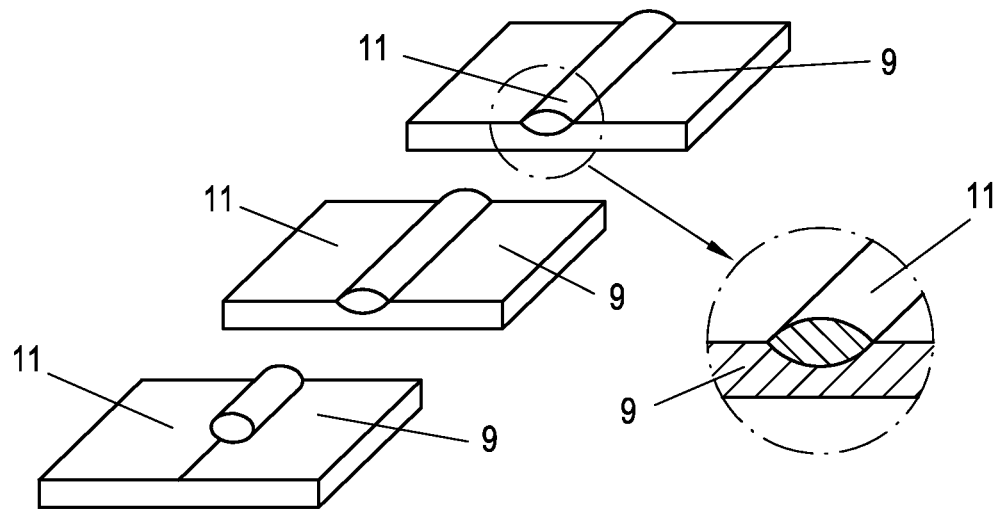
Figure 6:
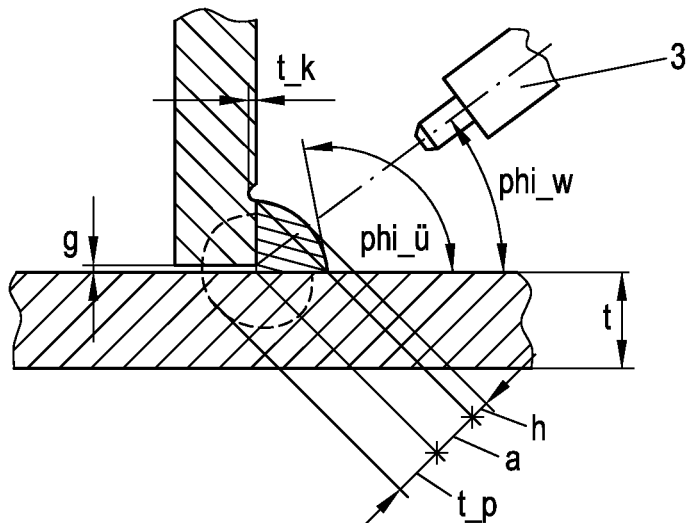
Figure 7A:
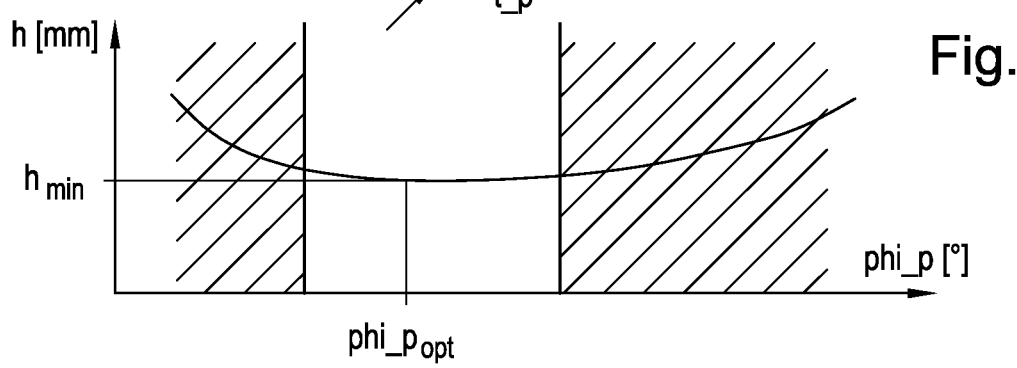
Figure 7B:
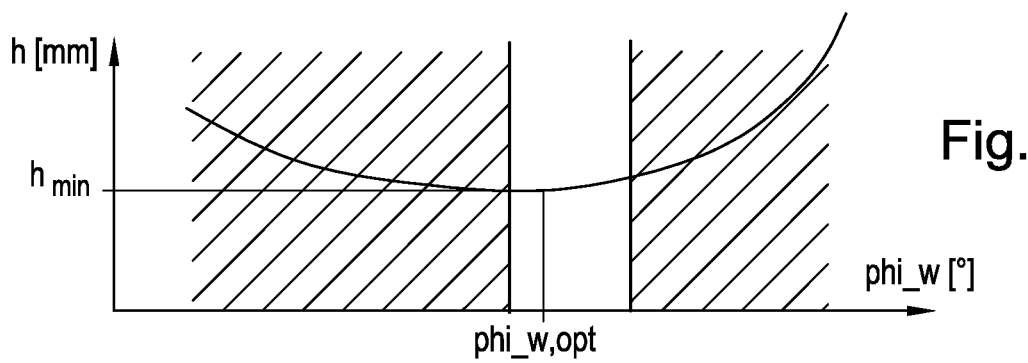
Figure 7C:
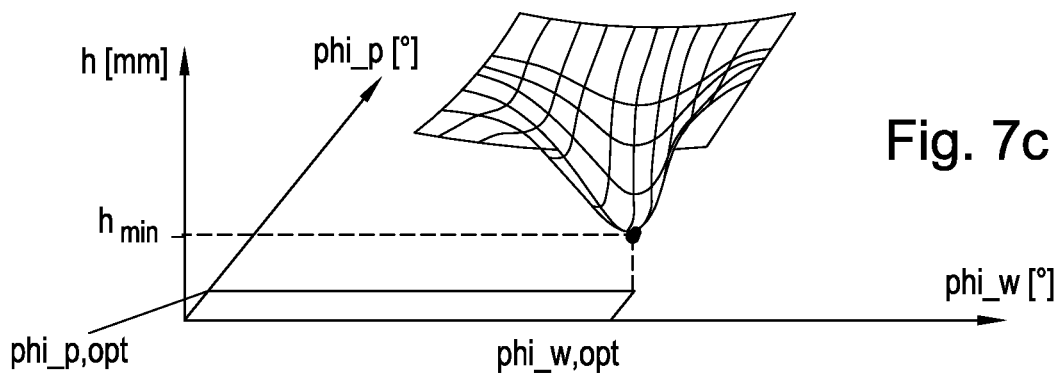

There are shown therein:

FIG. 1 a diagrammatic overview illustration of a welding process;

FIG. 2 a functional sketch of the method according to the invention for the automatic determining of optimum welding parameters for carrying out a weld on a workpiece;

FIG. 3 an illustration of a system for carrying out the method according to the invention;

FIG. 4 a block diagram to illustrate the carrying out of the method according to the invention;

FIGS. 5a-5c various methods for the measuring of test weld seams on test workpieces;

FIG. 6 a sectional image through a welded workpiece in the form of a fillet weld; and FIGS. 7a-7c the profiles of some characteristics of the resulting weld seam, to illustrate the finding of the optimum welding parameters with the aid of an example.

FIG. 1 shows a diagrammatic overview illustration of a welding process, wherein a welding system, which comprises a welding apparatus 1, a process robot 2 and a welding torch 3, which solves accordingly a welding problem on a workpiece 4. Accordingly, the welding torch 3 is guided along a predefined welding track 7 on the workpiece 4 and burns an arc 6 between the contact nozzle of the welding torch 3 or respectively the end of the welding wire 5 and the workpiece 4. Through the fusing of the material of the workpieces 4 and the melting off of the welding wire 5, a weld seam 8 is produced. Alternatively or additionally to the movement of the welding torch 3 in relation to the workpiece 4, the workpiece 4 can also be moved with respect to the welding torch 3. A relative movement between welding torch 3 and workpiece 4 along the welding track 7 is crucial. Various welding processes are carried out for the welding and depending on the respective position and arrangement of the workpiece 4 and the direction of the welding track 7, which corresponds to the tangential vector t of the welding track 7, specific welding parameters $P_i(x)$ are set. By means of these welding parameters $P_i(x)$, the welding processes or respectively the welding and thereby the weld seam 8 are substantially influenced. Depending on the respective welding task, different requirements are set for the weld seam 8. For example, the welding can be optimized via the setting of the welding parameters $P_i(x)$ for welding speed, secure penetration depth, vibration dynamics requirements, but also a visually pleasing weld seam 8. Therefore, for carrying out a weld on a workpiece 4, taking into account the respective welding task, there is always a set of optimum welding parameters $P_{i,opt}(x)$, which lead to optimum welding results.

The finding of such optimum welding parameters $P_{i,opt}(x)$ is a very complex method, which is usually reserved for experts or respectively specialists in the field of welding technology. The process of finding optimum welding parameters $P_{i,opt}(X)$ can last for an accordingly long time, which can lead to long waiting times and in some cases high costs. Furthermore, it can occur that to bridge such waiting times up to the finding of optimum welding parameters $P_{i,opt}(x)$, compromises are made, which are characterized by insufficient welding quality. It is therefore a matter of great concern to be able to undertake the finding of optimum welding parameters $P_{i,opt}(x)$ for specific welding tasks in the carrying out of welds on workpieces 4 as quickly as possible and also without the direct involvement of corresponding experts or respectively specialists.

FIG. 2 shows a functional sketch of the method according to the invention for automatically determining optimum welding parameters $P_{i,opt}(x)$ for carrying out a weld on a workpiece 4. Accordingly, several test welds are carried out on test workpieces 9 along the test welding tracks 10, and at each test weld at least one welding parameter $P_i(x)$ is automatically changed from a predefined initial value $P_{i,A}$ to a predefined final value $P_{i,E}$ along the test welding track 10. The change between the initial value $P_{i,A}$ and the final value $P_{i,E}$ of the respective welding parameter $P_i(x)$ can take place for example linearly or else in specific stages, wherein the correlation between the welding parameter $P_i(x)$ and the path x covered along the test welding track 10 is always predefined so that, vice versa, at each location x of the test welding track 10, a conclusion can be made regarding the welding parameter $P_i(x)$ which is set there. In particular with the use of very simple test workpieces 9 with preferably straight test welding tracks 10 or respectively test welding tracks 10 with constant tangential vector and an application-oriented arrangement of the test workpieces 9, test welds result which are able to be carried out very easily and quickly, and it is not necessary to weld complete workpieces or respectively components for test purposes, which would lead to great expense and waste.

The resulting test weld seams 11 along the test welding tracks 10 of the test workpieces 9 are measured by corresponding sensors 12, wherein this measuring can be carried out directly during the carrying out of the test weld or else later. In addition to sensors 12, which scan the test weld seam 11 in a contactless manner, or internal sensors which record parameters of the welding current source during the carrying out of the test weld, methods also come into consideration in which the test weld seam 11 is analyzed with destruction of the test workpiece 9. For example, micrographs of the test weld seam 11 can be made at several locations along the test welding track 10 and can be processed for example by means of image processing.

The sensors 12 deliver various sensor signals $S_j(P_i(x))$, which are processed to at least one quality parameter $Q_k(S_j(P_i(x)))$ characterizing the respective test weld seam 11 of the test workpieces 9. The type of calculation of the quality parameters $Q_k(S_j(P_i(x)))$ from the sensor signals $S_j(P_i(x))$ depends on the respective welding task and on the criterion which is characteristic for the completion of the respective welding task.

For easier processing of the quality parameters $Q_k(S_j(P_i(x)))$, a quality functional $G(Q_k(S_j(P_i(x))))$ is calculated for characterizing the quality of the test weld seams 11 as a function of the changed welding parameters $P_i(x)$. Therefore, with the quality functional, a real number results in multi-dimensional space, which has at least one optimum, in particular maximum or minimum, which is able to be found in a manner which is able to be automated relatively easily. As sketched in FIG. 2, the optimum $G_{opt}$ of the quality functional G can be a maximum of the area dependent on the welding parameters $P_1$ and $P_2$. Through corresponding calculation, this optimum of the quality functional $G_{opt}$ can be found quickly within specific limits in the parameter space. From this optimum of the quality functional $G_{opt}(Q_k(S_j(P_i(x))))$ the respective optima of the quality parameters $Q_{k,opt}(S_j(P_i(x)))$ and from the corresponding locations $x_{opt}$ of the test welding tracks 10 finally the values are defined and saved for the respective optimum welding parameters $P_{i,opt}$. With these optimum welding parameters $P_{i,opt}$ the welding is carried out on the workpiece 4, resulting in an optimum welding quality corresponding to the welding task.

In contrast to known methods hitherto, the direct deployment of experts or respectively specialists in welding technology is not necessary here. Of course, however, such experts and specialists in welding technology must be used for the defining of the quality parameters $Q_k(S_j(P_i(x)))$ and of the quality functional $G(Q_k(S_j(P_i(x))))$. For specific welding tasks on specific workpieces with specific workpiece geometries, however, numerous test welds on test workpieces 9 and numerous variants of quality parameters and quality functionals can be defined and saved in corresponding data bases and, with access thereto, optimum welding parameters $P_{i,opt}$ can be automatically defined quickly for individual welding tasks.

FIG. 3 shows an illustration of a welding system for carrying out the method according to the invention. By means of the welding apparatus 1, the welding torch 3, arranged on the process robot 2, for carrying out test welds on test workpieces 9 is controlled accordingly. The welding apparatus 1 and the process robot 2 are actuated accordingly via a control device 17 or respectively a computer, so that the test welds can be carried out on corresponding test workpieces 9 along predefined test welding tracks 10. By means of suitable sensors 12, the weld seam 11 can be measured along the test welding track 10 during the carrying out of the test weld or else after the carrying out of the test weld. For example, optical sensors 13, X-ray sensors 14, temperature sensors 15 or else eddy current sensors 16 come into consideration as sensors 12. Internal sensors can also record parameters of the welding current source during the carrying out of the test weld. The sensor signals $S_j(P_i(x))$ received by the sensors 12 are processed via the control device 17 and are deposited in corresponding memories or respectively data bases 18. Furthermore, according to the respective welding task, quality parameters $Q_k(S_j(P_i(x)))$ are calculated from the sensor signals $S_j(P_i(x))$, which characterized the individual test weld seams 11 accordingly. Since along a test weld seam respectively at least one welding parameter $P_i(x)$ is changed from an initial value $P_{i,A}$ to a final value $P_{i,E}$, a point or respectively region which has optimum characteristics exists along the test weld seam 11. These optimum characteristics of the test weld seam 11 are detected accordingly by means of the sensors 12 and are processed accordingly in the control device 17. At the location along the test weld seam 11 at which optimum characteristics of the test weld seam are defined, a back calculation can be carried out to the parameter $P_i(x)$ which is valid there, and this can be defined as optimum and saved accordingly. From the plurality of test workpieces 9 and their test weld seams 11 and the sensor signals $S_j(P_i(x))$, a plurality of data results, which are deposited in the memories or respectively data bases 18. The data base 18 represents quasi a knowledge data base, in which the expert knowledge of the experts and specialists who are knowledgeable in welding technology is present in a structured manner and can be accessed for the defining of optimum welding parameters $P_{i,opt}$.

FIG. 4 shows the principle of finding the optimum welding parameters $P_{i,opt}$ from this information which is saved in the data bases 18. Accordingly, the control device 17 or respectively the computer is loaded with specific data by which a specific welding task is characterized for carrying out a weld on a workpiece 4. In particular, the specific quality parameter $Q_k$ and the quality functional G will be as a function of the quality parameters $Q_k$, or from a plurality of such quality parameters $Q_k$ or quality functionals G at least one specific quality parameter $Q_k$ or respectively a specific quality functional G is selected. From the available information of the sensor signals $S_j(P_i(x))$ obtained from the test welds, a back-calculation can be carried out to the respective optimum welding parameters $P_{i,opt}$ via the procedure, described above, of finding the optimum of the quality functional $G_{opt}$. These optimum welding parameters $P_{i,opt}$ are then passed on to the welding apparatus 1 and the process robot 2 of the welding system, and the welding is carried out on the workpiece 4 along the welding track 7 with these optimum welding parameters $P_{i,opt}$, resulting in a weld seam 8 with optimum characteristics for the respective welding problem which is to be solved.

FIGS. 5a to 5c show various sketches to illustrate the measuring of test weld seams 11 on test workpieces 9. FIG. 5a shows a method for measuring the test weld seam 11 during the carrying out of the test weld, by for example optical sensors 13 or temperature sensors 15 being arranged downstream of the welding torch 3, which sensors scan the weld seam 11 accordingly and receive and pass on the obtained sensor signals S (x) depending on the location along the test welding track 10.

Alternatively or additionally to the above method illustrated in FIG. 5a, also subsequently in accordance with FIG. 5b the test workpiece 9 or respectively the test weld seam 11 can be measured along the test welding track 10, by means of various sensors, such as e.g. optical sensors 13, X-ray sensors 14 or else eddy current sensors 16, which can lead to various quality parameters over the weld seam 11.

In FIG. 5c a method is sketched in which the test workpiece 9 is destroyed for the analysis of the test weld seam 11, by micrographs of the test weld seam 11 and of the surrounding test workpiece 9 being produced at various locations along the test welding track 10. These micrographs can be measured by corresponding sensors and image-processing methods and can provide information concerning the quality of the test weld seam 11. When, with regard to the fulfilling of a specific welding task, a specific micrograph has optimum characteristics, for example optimum penetration depth or suchlike, the respective welding parameter $P_i(x)$ which is used at this location of the test weld seam 11 can be identified and defined and saved as optimum welding parameter $P_{i,opt}$.

The automatic methods for measuring the test weld seams 11 along the test welding tracks 10 of the test workpieces 9 can be automated with the use of corresponding devices, so that the plurality of data which can assess the test weld seams 11 can be quickly found and saved.

FIG. 6 shows a sectional view through a welded workpiece with corresponding parameters, which characterize the workpieces and the weld seam accordingly. Included in these parameters are for example:
  t thickness of the workpieces
  g gap width between the workpieces
  a weld seam thickness h seam superelevation
t_p penetration depth
t_k depth of the undercut
phi_ü seam transition angle
phi_p angle of attack between welding torch and workpiece in the direction of the weld seam (not illustrated in FIG. 6)
phi_w working angle between welding torch and workpiece in the direction transversely to the weld seam In addition to these parameters for characterization of a weld seam, which are cited by way of example, several further other parameters exist, which can likewise be drawn upon for carrying out the represented method and can be received by corresponding sensors. For example, the amount of spatter, fusion faults, the number of pores in the weld seam and the reproducibility can be named as welding parameters which can characterize the welding.

FIGS. 7a-7c show now with the aid of an example the finding of optimum welding parameters for a specific welding task. In this example, the task consists of keeping the seam superelevation h of a weld seam as small as possible, by the angle of attack ph_p of the welding torch with respect to the workpiece and the working angle phi_w of the welding torch being varied accordingly, and the optimum parameters being selected therefrom. Accordingly, in this example test welds are carried out in which the angle of attack phi_p is changed from an initial value to a final value along the test weld seam of a test workpiece, and in a further test weld the working angle phi_w is changed from an initial value to a final value along the test welding track. The resulting test weld seams on these test workpieces are measured and a sensor signal corresponding to the seam superelevation h is recorded. Therefore, profiles of the seam superelevation h result as a function of the angle of attack phi_p (FIG. 7a) and h as a function of the working angle phi_w (FIG. 7b).

After definition of a quality functional G dependent on the seam superelevation h, an area profile results for the seam superelevation h as a function of the angle of attack phi_p and of the working angle phi_w, as sketched in the diagram of FIG. 7c. The quality functional G has at least one optimum, in the represented example at least one minimum, which is able to be determined easily, and permit a back-calculation to the optimum values for the angle of attack phi_p,$_{opt}$ and the working angle phi_w,$_{opt}$.

In real welds, more than two welding parameters are varied, resulting in a multi-dimensional function of the quality functional G dependent on the respective variable welding parameters $P_i(x)$.

The represented method permits a rapid finding of ideal welding parameters $P_{i,opt}$ from a plurality of collected data with the aid of test welds which were carried out with the aid of test workpieces, without corresponding experts or specialists in the field of welding technology having to be directly involved.

The invention claimed is:

1. A method for automatically determining optimum welding parameters ($P_{i,opt}$) for carrying out a weld on a workpiece (4), comprising:

carrying out via a welding torch arranged on a process robot actuated by a control device a plurality of test welds on test workpieces (9) along test welding tracks (10), and automatically changing at each test weld at least one welding parameter ($P_i(x)$) along the test welding track (10) linearly or in specific stages along the test welding track (10) on a predefined length (l) from a predefined initial value ($P_{i,A}$) to a predefined final value ($P_{i,E}$), depending on the location (x), wherein each test weld is carried out along predefined test welding tracks (10) with a constant tangential vector (t);

measuring each resulting test weld seam (11) along the test welding track (10) during or after carrying out the plurality of test welds with at least one sensor (12), and receiving at least one sensor signal ($S_j(P_i(x))$), depending on the location (x) along the test weld seam (11);

processing the at least one sensor signal ($S_j(P_i(x))$) via the control device and depositing the at least one sensor signal ($S_j(P_i(x))$) so processed in a database;

calculating via the control device at least one quality parameter ($Q_k(S_j(P_i(x)))$) which characterizes each weld seam (11) from the at least one sensor signal ($S_j(P_i(x))$);

calculating via the control device a quality functional ($G(Q_k(S_j(P_i(x))))$) for characterizing the quality of the test weld seams (11) in accordance with the changed welding parameters ($P_i(x)$) from the at least one quality parameter ($Q_k(S_j(P_i(x)))$); and ascertaining via the control device an optimum of the quality functional ($G_{opt}(Q_k(S_j(P_i(x))))$), and determining via the control device from this determined optimum of the quality functional ($G_{opt}(Q_k(S_j(P_i(x))))$) the respective optima of the quality parameters ($Q_{k,opt}(S_j(P_i(x)))$), and from the optima of the quality parameters ($Q_{k,opt}(S_j(P_i(x)))$) from the sensor signals ($S_j(P_i(x))$) identifying via the control device those locations (x) as optimum locations ($x_{opt}$) along the test weld seam (11) at which the welding result of the test weld is optimum according to the respective quality parameter ($Q_k(S_j(P_i(x)))$), and defining via the control device the welding parameters ($P_i(x)$) at these locations ($x_{opt}$) of the test weld seams (11), identified as optimum, as values for the optimum welding parameters ($P_{i,opt}$) for carrying out the welding on the workpiece (4), and saving the values in the database; and carrying out the welding of the workpiece using the values saved in the database.

2. The method according to claim 1, wherein the test welding tracks (10) are measured before carrying out the test welds.

3. The method according to claim 1, wherein at each test weld at least one of the welding parameters ($P_i(x)$) wire feed speed ($v_D(x)$) of a welding wire (5) which is to be melted off, welding speed ($v_s(x)$), free welding wire length, angle of attack (phi_p(x)) of the welding torch (3), working angle (phi_w(x)) of the welding torch (3) and tool center point (TCP(x)) of the welding torch (3) is changed along the test welding track (10), depending on the locations (x).

4. The method according to claim 1, wherein the test welds are carried out on flat test workpieces (9).

5. The method according to claim 1, wherein the test weld seams (11) are measured along the test welding track (10) by non-destructive measurement methods.

6. The method according to claim 1, wherein the test weld seams (11) are processed along the test welding track (10) by destructive measurement methods.

7. The method according to claim 1, wherein the test welds are carried out under various welding conditions ($B_j$), and the optimum welding parameters ($P_{i,opt}$) for the welding under a predefined welding condition ($B_v$) is carried out by interpolation of the optimum welding parameters ($P_{i,opt}$) which were determined at test welds under the bordering welding conditions ($B_u$, $B_o$) for the predefined welding condition ($B_v$).

8. The method according to claim 7, wherein the test welds are carried out under at least two different welding conditions ($B_l$) respectively of the workpiece temperature, position of the test workpiece (9), opening angle of the test workpieces (9) around the test welding track (10) or the gap width of the test welding track (10).

9. The method according to claim 7, wherein before the carrying out of the interpolation, the quality functional $G(Q_k(S_j(P_i(x))))$ is determined at the predefined welding condition ($B_v$) and, when the quality functional $G(Q_k(S_j(P_i(x))))$ deviates from a threshold value, at least one further test weld is carried out at a further test welding condition ($B_z$).

10. The method according to claim 1, wherein the width, height, superelevation, under-curvature, seam filling volume and/or the transition angle of the test weld seam (11) is scanned and from these sensor signals ($S_j(P_i(x))$) the quality parameter ($Q_k(S_j(P_i(x))$) is calculated along the test welding track (10).

11. The method according to claim 1, wherein the optimum of the quality functional ($G_{opt}(Q_k(S_j(P_i(x)))$) is determined by successive changing respectively of a welding parameter ($P_i(x)$) for influencing respectively a quality parameter ($Q_k(S_j(P_i(x)))$).

12. The method according to claim 1, wherein the optimum of the quality functional ($G_{opt}(Q_k(S_j(P_i(x)))$) is determined by changing in terms of gradient several welding parameters ($P_i(x)$) for influencing several quality parameters ($Q_k(S_j(P_i(x)))$).

* * * * *